C. CLARK.
FAUCET.
APPLICATION FILED JAN. 16, 1908.
903,451.
Patented Nov. 10, 1908.
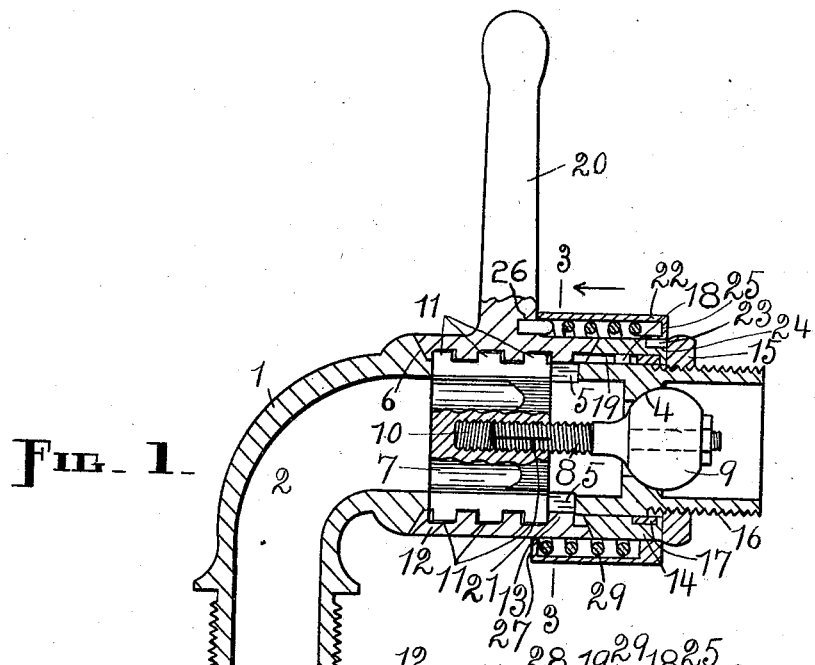
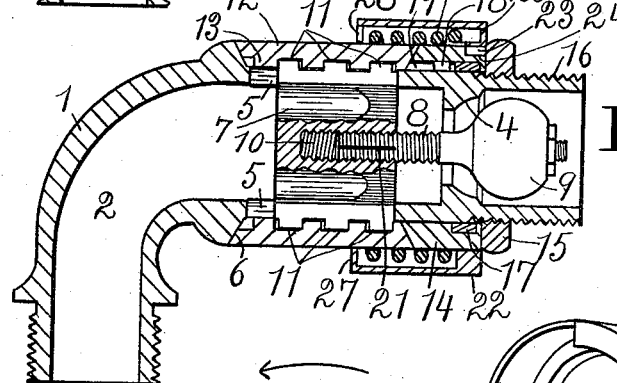
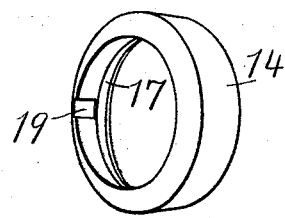
Fig. 4.
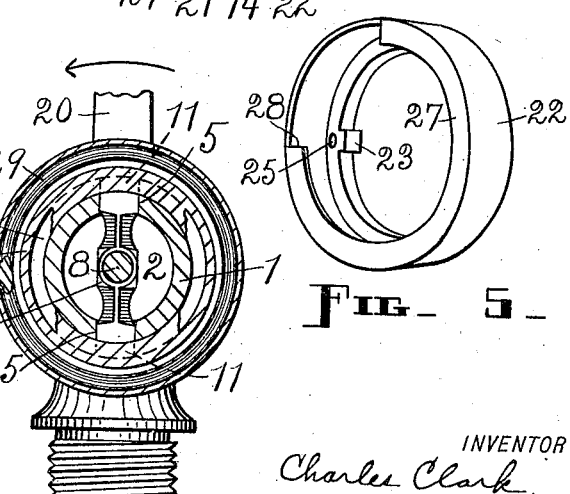
Fig. 3.
Fig. 5.
WITNESSES
A. C. Fairbanks
John H. Turcotte
INVENTOR
Charles Clark,
BY
Webster & Co.
ATTORNEYS
THE NORRIS PETERS CO., WASHINGTON, D. C.

UNITED STATES PATENT OFFICE.

CHARLES CLARK, OF SPRINGFIELD, MASSACHUSETTS.

FAUCET.

No. 903,451.　　　Specification of Letters Patent.　　　Patented Nov. 10, 1908.

Application filed January 16, 1908. Serial No. 411,081.

*To all whom it may concern:*

Be it known that I, CHARLES CLARK, a citizen of the United States of America, residing at Springfield, in the county of Hampden and State of Massachusetts, have invented a new and useful Faucet, of which the following is a specification.

My invention relates to improvements in valves and more particularly to that class of valves known as faucets, and consists of a non-rotary reciprocating valve, certain peculiar mechanism for converting a rotary motion into a reciprocating motion for actuating such valve, and means to render the valve self-closing, together with such auxiliary and subsidiary parts and combinations of parts as are necessary to the proper construction of the faucet, all as hereinafter set forth.

The objects of my invention are, first, to produce a strong and durable, quick-acting, and positive faucet, which closes with the pressure of the liquid, and may be made self-closing if desired; second, to provide a faucet which is capable of being operated by about one-quarter turn of the handle, either to close or open the valve, the movement of the operating mechanism being limited by stops or abutments, and which has a non-rotary valve, the abutments for said mechanism at the end of the closing movement and the non-rotary character of said valve preventing undue strain and wear on the valve on the one hand and minimizing wear on the other hand, to the end that the life of said valve is greatly prolonged, which is a very valuable feature of my invention; fourth, to afford means for adjusting different parts of the faucet and for taking up wear thereof, and, fifth, to provide a device which embodies the various advantages enumerated above in a practicable and efficient manner, and which is easy to assemble and take apart. I attain these objects by the means and mechanism illustrated in the accompanying drawings, in which—

Figure 1 is a longitudinal section through one form of my faucet, showing the valve closed; Fig. 2, a similar section showing said valve open; Fig. 3, a cross-section on lines 3—3, looking in the direction of the arrow, in Fig. 1; Fig. 4, a perspective view of the retaining collar for the actuating sleeve, and, Fig. 5, a perspective view of the casing or cover for the self-closing spring.

Similar figures refer to similar parts throughout the several views.

In the embodiment of my invention as it appears in the drawings, a casing is represented at 1, through which a passage 2 extends, and in which there is a valve-seat 4. The style of this casing may vary, more or less, as may be desired. Oppositely disposed slots 5—5 are cut in the casing 1 between its ends, preferably at the top and bottom, and a shoulder 6 is formed around the outside of said casing in advance of said slots or of the vertical plane of the front ends of the slots, such shoulder being beveled from within outward and forward. A substantially flat carrier-block 7, for the stem 8 of a valve 9, is adapted to be received into the passage 2 and to extend into and be guided in the slots 5. This block has a central longitudinal passage 10 therein, screw-threaded to receive the screw-threaded part of the valve-stem 8, and said block is provided on its upper and under edges with teeth 11. By moving the block 7 backward and forward, after proper adjustment of the parts, the valve 9 is caused to open and close the faucet by receding from the valve-seat 4 to open it and becoming seated thereon to close it. To move the block 7 back and forth I employ a sleeve 12, mounted to rotate on the horizontal part of the casing 1 and provided with a coarse internal thread or worm 13 which engages or meshes with the block teeth 11. The sleeve 12 is held against endwise movement by the shoulder 6, a retaining collar 14, and a set-nut or lock-ring 15, the latter being screwed on to the rear screw-threaded terminal 16 of the casing. There is a packing-ring 17, usually of rubber, let into the interior of the collar 14, which fits tightly around the casing 1 and prevents leakage at this the only point where it might occur. A lug 18, projecting from the outside of the casing, is received into a groove or key-way 19 in the collar 14 to prevent the latter from being turned. The front end of the collar 14 is beveled in a similar manner to the shoulder 16, only in the opposite direction, and the ends of the sleeve 12 are undercut to fit snugly the contiguous beveled surfaces; in this way provision is made for tight joints and also for taking up wear. In practice the lock-ring 15 should be so set as to cause the sleeve 12 to be held tightly between the shoulder 6 and the collar 14, and yet not so tightly as to materially interfere with turning said sleeve. To take up wear between the last-mentioned members it is simply necessary to screw up the lock-ring a little tighter. It will now be seen that, by giving the sleeve 12 a turn in the proper direction to actuate the block 7 from the forward position shown in the first view to the rearward position shown in the second view, that is, from contact with the front ends of the slots 5 into contact with the back ends of said slots, the proper direction in the present construction being in the direction of the arrow in Fig. 3, the valve 9 will be forced from its seat, and that said valve will be reseated by turning said sleeve back again, the threads 13 and the teeth 11 being the mediums through which said block and said valve with its stem are operated. About one-quarter turn of the sleeve carries the block the length of the slots 5. The sleeve 12 is provided with a handle 20 which affords a convenient means for rotating said sleeve.

The valve-stem 8 is screwed into the block 7 just far enough to enable the valve 9 to make a good closing contact with its seat when said block contacts with the front ends of the slots 5, so that a tight and positive closing of the faucet is insured and at the same time injury to the valve is avoided. Any wear on the part of the valve is taken up by screwing its stem further into the passage 10. Thus it is clear that there is no difficulty either in adjusting the valve or of compensating for wear. By slitting that portion or a part of it of the valve-stem 8 which is designed to enter the passage 10, and spreading the stem slightly, the amount of frictional resistance between the thread-engaging parts is increased and there is no liability of displacement after said stem has been properly adjusted. Such a slit appears at 21.

In order that the faucet may be self-closing, I mount a casing or cover 22 on the collar 14, a lug 23 in said cover entering a slot 24 in said collar to prevent the cover from turning, and place a spiral-spring 29 within the cover and around the collar and the adjacent section of the sleeve 12, with one end attached to the cover at 25 and the other end attached to the sleeve or to the base of the handle 20 at 26. The spring 29 is so wound within the cover that its resiliency must be overcome in order to turn the sleeve to open the valve, and it acts immediately the handle 20 is released to return the sleeve to the starting point and so close the valve. On the front end of the cover 22 is an inturned flange 27 which bears on the sleeve 12. The flange 27 is cut away at 28 to leave room for the terminal of the spring 29 which engages the handle 20 to operate in. The lock-ring 15 assists in holding the cover 22 as well as the collar 14 in place. This self-closing feature can be omitted in such cases as it is not wanted.

The parts of the faucet are assembled by first inserting the block 7 through one of the slots 5 into the casing 1 and introducing the valve 9 at the back end into such casing with the stem 8 in advance and screwing said stem into said block as far as may be necessary; next passing the sleeve 12 over the rear end of said casing, working it by the lug 18 and bringing its thread 13 into engagement with the teeth 11, and manipulating it until its front end is against the shoulder 6; then slipping the collar 14 into place against the back end of said sleeve, with the lug 18 in the slot 19; then placing the spring 29 and the cover 22 in position as described, the ends of said spring being received into the cover opening 25 and the handle opening 26, respectively, and the cover lug 23 being received into the collar slot 24, and finally screwing the lock-ring 15 on to the terminal 16. At this time the valve-stem and the movable sleeve-retaining members are properly adjusted. By reversing this order the faucet can be readily taken apart.

Such changes in shape, size, and minor details of construction, as would suggest themselves to one skilled in the art, may be made without departing from the nature of my invention.

What I claim as my invention, and desire to secure by Letters Patent, is—

1. The combination, in a faucet, with a slotted casing having a through or main passage and provided with a valve-seat, and a valve for the said seat, said passage being open except when closed by said valve, of a carrier-block for and in advance of the valve, such block being located crosswise in said passage without materially obstructing the same and arranged to reciprocate in the casing slots, and a rotary sleeve mounted on said casing over said slots to engage, support and center said block and when rotated to actuate the same.

2. The combination, in a faucet, with a slotted and shouldered casing having a valve-seat therein, and a valve for said seat, of a carrier-block for said valve located in the through or main passage in the casing and arranged to reciprocate in the casing slots, a rotary sleeve mounted on the casing over said slots to engage, support and center said block and when rotated to actuate the same, a retaining collar for said sleeve also mounted on the casing and keyed thereto, the sleeve being between the shoulder on the casing and said collar, and adjustable means to prevent rearward displacement of the collar.

3. The combination, in a faucet, with a slotted casing having a valve-seat therein, of a valve for said seat, a carrier-block for said valve located in the through or main passage in the casing and arranged to reciprocate in the casing slots, a rotary sleeve mounted on the casing over said slots to engage, support and center said block and when rotated to actuate the same, and means to cause said valve to come to its seat when the block encounters the ends of said slots most remote from said valve-seat.

4. The combination, in a faucet, with a slotted casing having a valve-seat therein, of a reciprocating block located in the through or main passage in said casing, crosswise, and extending into the slots in the casing, such block having a longitudinal screw-threaded passage therein, a valve for said seat provided with a screw-threaded stem adapted to enter the aforesaid passage in the block, and a rotary sleeve mounted on the casing over said slots to engage, support and center the block and when rotated to actuate the same.

5. The combination, in a faucet, with a slotted casing having a valve-seat therein, and a valve for said seat, of a carrier block for and in advance of said valve located in the through or main passage in the casing, crosswise, and arranged to reciprocate in the casing slots and provided on its outer edges with teeth, and a rotary sleeve having a worm for engagement with the teeth, said sleeve being mounted on the casing over said slots to support and center the block while engaging and when rotated actuating the same.

6. The combination, in a faucet, with a slotted and shouldered casing having a valve-seat therein, and a valve for said seat, of a carrier-block for said valve arranged to reciprocate in the casing slots, a rotary sleeve mounted on the casing in operative engagement with said block, a retaining collar for said sleeve also mounted on the casing, the sleeve being between the casing shoulder and said block, means to prevent the collar from rotating, a cover mounted on the collar, means to prevent said cover from rotating, a spiral-spring in the cover and attached thereto at one end and connected with the sleeve at the other end, and means to prevent backward displacement of the collar and cover.

7. The combination, in a faucet, of a slotted casing having a valve-seat therein, a valve for said seat, a reciprocating carrier-block for said valve extending through the slots in the casing, a rotary sleeve mounted on said casing over said slots to engage, support and center said block and when rotated to actuate the same, and means to hold said sleeve against endwise movement.

8. The combination, in a faucet, of a slotted casing having a valve-seat therein, a valve for said seat, a reciprocating carrier-block for said valve extending through the slots in the casing, a rotary sleeve mounted on said casing over said slots to engage, support and center said block and when rotated to actuate the same, said sleeve being spring-pressed in one direction, and means to hold the sleeve against endwise movement.

CHARLES CLARK.

Witnesses:
 ALFRED C. FAIRBANKS,
 F. A. CUTTER.